(12) United States Patent
Khare et al.

(10) Patent No.: US 11,777,781 B2
(45) Date of Patent: Oct. 3, 2023

(54) METHOD, APPARATUS AND COMPUTER PROGRAM FOR CONDITIONALLY TRIGGERING NOTIFICATION OF AT LEAST ONE EVENT

(71) Applicant: NOKIA TECHNOLOGIES OY, Espoo (FI)

(72) Inventors: Saurabh Khare, Bangalore (IN); Colin Kahn, Morris Plains, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/394,549

(22) Filed: Aug. 5, 2021

(65) Prior Publication Data
US 2022/0060367 A1   Feb. 24, 2022

(30) Foreign Application Priority Data
Aug. 6, 2020 (WO) ................. PCT/EP2020/072085

(51) Int. Cl.
| | |
|---|---|
| H04M 3/42 | (2006.01) |
| G06F 15/173 | (2006.01) |
| H04L 41/0246 | (2022.01) |
| H04W 8/18 | (2009.01) |
| H04W 48/18 | (2009.01) |
| H04W 68/00 | (2009.01) |

(52) U.S. Cl.
CPC .......... H04L 41/0246 (2013.01); H04W 8/18 (2013.01); H04W 48/18 (2013.01); H04W 68/005 (2013.01)

(58) Field of Classification Search
CPC .... H04L 41/0246; H04W 8/18; H04W 48/18; H04W 68/005

USPC ........................................................ 455/414.1
See application file for complete search history.

(56) References Cited

U.S. PATENT DOCUMENTS

| | | | |
|---|---|---|---|
| 11,310,731 B1 * | 4/2022 | Feder | ................... H04W 36/32 |
| 2013/0132551 A1 | 5/2013 | Bose et al. | |
| 2013/0232146 A1 | 9/2013 | Dinger et al. | |
| 2016/0255165 A1 | 9/2016 | Hayashi et al. | |
| 2017/0250870 A1 | 8/2017 | Zhao | |
| 2019/0335350 A1 | 10/2019 | Yao et al. | |
| 2019/0364541 A1 | 11/2019 | Ryu | |

(Continued)

FOREIGN PATENT DOCUMENTS

| | | |
|---|---|---|
| EP | 2 442 597 A1 | 4/2012 |
| EP | 3 592 012 A1 | 1/2020 |
| WO | WO 2020/099958 A1 | 5/2020 |

OTHER PUBLICATIONS

"3rd Generation Partnership Project; Technical Specification Group Services and System Aspects; IP Multimedia Subsystem (IMS); Stage 2 (Release 16)", 3GPP TS 23.228 v16.4.0, (Mar. 2020), 349 pages.

(Continued)

*Primary Examiner* — Mark G. Pannell
(74) *Attorney, Agent, or Firm* — ALSTON & BIRD LLP (57) ABSTRACT

There is provided an apparatus, said apparatus comprising means for receiving, at a first network function from a second network function, a subscription request for notification of at least one event, wherein the subscription request comprises at least one condition to trigger notification of the at least one event, and providing a notification of the at least one event to the second network function accoriding to the at least one condition.

22 Claims, 7 Drawing Sheets

(56) References Cited

U.S. PATENT DOCUMENTS

| | | | |
|---|---|---|---|
| 2020/0112868 A1* | 4/2020 | Shariat | H04W 48/06 |
| 2020/0174855 A1 | 6/2020 | Zhao et al. | |
| 2020/0178198 A1* | 6/2020 | Ding | H04W 60/04 |
| 2020/0252813 A1* | 8/2020 | Li | G06Q 20/382 |
| 2020/0322775 A1* | 10/2020 | Lee | H04W 8/02 |
| 2020/0367110 A1* | 11/2020 | Sun | H04L 43/16 |
| 2021/0014141 A1* | 1/2021 | Patil | H04W 24/02 |
| 2021/0099367 A1* | 4/2021 | Han | H04W 24/10 |
| 2021/0105656 A1* | 4/2021 | Estevez | H04L 41/147 |
| 2021/0105665 A1* | 4/2021 | Bennett | H04W 48/16 |
| 2021/0168651 A1* | 6/2021 | Marquezan | H04W 28/0838 |
| 2021/0211970 A1* | 7/2021 | Lee | H04W 48/06 |
| 2021/0321251 A1* | 10/2021 | Colom | H04W 8/26 |
| 2022/0191664 A1* | 6/2022 | Muñoz De La Torre Alonso | H04L 67/14 |
| 2022/0232369 A1* | 7/2022 | Puente Pestaña | H04L 67/14 |

OTHER PUBLICATIONS

"3rd Generation Partnership Project; Technical Specification Group Services and System Aspects; Study of Enablers for Network Automation for 5G (Release 16)", 3GPP TR 23.791 v16.2.0, (Jun. 2019), 124 pages.

"3rd Generation Partnership Project; Technical Specification Group Services and System Aspects; Study on Enablers for Network Automation for the 5G System (5GS); Phase 2 (Release 17)", 3GPP TR 23.700-91 v0.4.0 (Jun. 2020), 186 pages.

"5G; System Architecture forthe 5G System (3GPP TS 23.501 version 15.2.0 Release 15)", ETSI TS 123 501 v15.2.0., (Jun. 2018), 219 pages.

International Search Report and Written Opinion for Patent Cooperation Treaty Application No. PCT/EP2020/072085 dated May 4, 2021, 14 pages.

Pateromichelakis et al., "End-to-End Data Analytics Framework for 5G Architecture", IEEE Access, vol. 7, (Mar. 5, 2019), pp. 40295-40312.

First Examination Report for Indian Application No. 202347014036 dated Jul. 27, 2023, 7 pages.

* cited by examiner

METHOD, APPARATUS AND COMPUTER PROGRAM FOR CONDITIONALLY TRIGGERING NOTIFICATION OF AT LEAST ONE EVENT

CROSS-REFERENCE TO RELATED APPLICATIONS

This application claims priority to International Application No. PCT/EP2020/072085, filed August 6, 2020, the entire contents of which are incorporated herein by reference.

FIELD

The present application relates to a method, apparatus, system and computer program and in particular but not exclusively to managing data delivered to a customer.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for receiving, at a first network function from a second network function, a request for notification of at least one event, wherein the request comprises at least one condition to trigger notification of the at least one event, and providing a notification of at least one occurrence of the at least one event to the second network function accoridng to the at least one condition. The request for notification of at least one event may be a subscription request.

The apparatus according to the first aspect may comprise means for determining the at least one occurrence of the at least one event.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The apparatus may comprise means for, upon meeting the condition, providing a single notification for at least one occurrence of the at least one event or a combined notification for a plurality of occurrences of the at least one event. For example upon meeting the condition the apparatus may providing a single notification each occurrence of the at least one event or a combined notification all plurality of occurrences of the at least one event.

The second network function may be a network data analytics function or a consumer network function.

The first network function may comprise a proxy function.

The apparatus may comprise means for receiving the request from the second network function at the proxy function via a third network function.

Means for determining at least one occurrence of the at least one event may comrpise means for receiving an indication of the at least one occurrence from at least one data source at the proxy function.

The first network function may comprise at least one of an access and mobility management function, a session management function, a policy control function, unified data management, application function or operations, administration and management entity.

The apparatus may comprise means for providing an indication from the first network function to a network resource function that the first network function supports conditional notification.

In a second aspect there is provided an apparatus comprising means for providing, to a first network function from a second network function, a request for notification of at least one event, wherein the request comprises at least one condition to trigger notification of the at least one event and receiving a notification of the at least one event from the first network function at the second network function according to the at least one condition. The request for notification of at least one event may be a subscription request.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The second network function may be a network data analytics function or a consumer network function.

The first network function may comprise a proxy function.

The apparatus may comprise means for providing the request from the second network function to the proxy function via a third network function.

The first network function may comprise at least one of an access and mobility management function, a session management function, a policy control function, unified data management, application function or operations, administration and management entity.

The apparatus may comrpise means for receiving an indication at the second network function from a network resource function that the first network function supports conditional notification.

In a third aspect there is provided a method comprising receiving, at a first network function from a second network function, a request for notification of at least one event, wherein the request comprises at least one condition to trigger notification of the at least one event, and providing a notification of at least one occurrence of the at least one event to the second network function according to the at least one condition. The request for notification of at least one event may be a subscription request.

The method according to the third aspect may comprise means for determining the at least one occurrence of the at least one event.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The method may comprise, upon meeting the condition, providing a single notification for at least one occurrence of the at least one event or a combined notification for a plurality of occurrences of the at least one event. For example upon meeting the condition the method may comprise providing a single notification for each occurrence of the at least one event or a combined notification for all occurrences of the at least one event.

The second network function may be a network data analytics function or a consumer network function.

The first network function may comprise a proxy function.

The method may comprise receiving the subscription request from the second network function at the proxy function via a third network function.

Determining at least one occurrence of the at least one event may comprise receiving an indication of the at least one occurrence from at least one data source at the proxy function.

The first network function may comprise at least one of an access and mobility management function, a session management function, a policy control function, unified data management, application function or operations, administration and management entity.

The method may comprise providing an indication from the first network function to a network resource function that the first network function supports conditional notification.

In a fourth aspect there is provided a method comprising providing, to a first network function from a second network function, a request for notification of at least one event, wherein the request comprises at least one condition to trigger notification of the at least one event and receiving a notification of the at least one event from the first network function at the second network function according to the at least one condition.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The second network function may be a network data analytics function or a consumer network function.

The first network function may comprise a proxy function.

The method may comprise providing the request from the second network function to the proxy function via a third network function.

The first network function may comprise at least one of an access and mobility management function, a session management function, a policy control function, unified data management, application function or operations, administration and management entity.

The method may comprise receiving an indication at the second network function from a network resource function that the first network function supports conditional notification.

In a fifth aspect there is provided an apparatus comprising at least one processor and at least one memory including a computer program code, the at least one memory and computer program code configured to, with the at least one processor, cause the apparatus at least to:

receive, at a first network function from a second network function, a request for notification of at least one event, wherein the request comprises at least one condition to trigger notification of the at least one event, and provide a notification of at least one occurrence of the at least one event to the second network function accoriding to the at least one condition.

In the apparatus according to the fifth aspect the at least one memory and computer program code may be configured to, with the at least one processor, cause the apparatus at least to: determine the at least one occurrence of the at least one event.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The apparatus may be configured to, upon meeting the condition, provide a single notification for at least one occurrence of the at least one event or a combined notification for a plurality of occurrences of the at least one event. For example upon meeting the condition the apparatus may be configured to, upon meeting the condition, provide a single notification for each occurrence of the at least one event or a combined notification for all occurrences of the at least one event.

The second network function may be a network data analytics function or a consumer network function.

The first network function may comprise a proxy function.

The apparatus may be configured to receive the request from the second network function at the proxy function via a third network function.

The apparatus may be configured to receive an indication of the at least one occurrence from at least one data source at the proxy function.

The first network function may comprise at least one of an access and mobility management function, a session management function, a policy control function, unified data management, application function or operations, administration and management entity.

The apparatus may be configured to provide an indication from the first network function to a network resource function that the first network function supports conditional notification.

In a sixth aspect there is provided an apparatus comprising at least one processor and at least one memory including a computer program code, the at least one memory and computer program code configured to, with the at least one processor, cause the apparatus at least to provide, to a first network function from a second network function, a request for notification of at least one event, wherein the request comprises at least one condition to trigger notification of the at least one event and receive a notification of the at least one event from the first network function at the second network function according to the at least one condition.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The second network function may be a network data analytics function or a consumer network function.

The first network function may comprise a proxy function.

The apparatus may be configured to provide the subscription request from the second network function to the proxy function via a third network function.

The first network function may comprise at least one of an access and mobility management function, a session management function, a policy control function, unified data management, application function or operations, administration and management entity.

The apparatus may be configured to receive an indication at the second network function from a network resource function that the first network function supports conditional notification.

In a seventh aspect there is provided a computer readable medium comprising program instructions for causing an apparatus to perform at least the following: receiving, at a first network function from a second network function, a request for notification of at least one event, wherein the request comprises at least one condition to trigger notification of the at least one event, and providing a notification of at least one occurrence of the at least one event to the second network function accoriding to the at least one condition.

The computer readable medium according to the seventh aspect may further comprise program instructions for causing the apparatus to further perform: determining the at least one occurrence of the at least one event.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The computer readable medium may further comprise program instructions for causing the apparatus to to perform, upon meeting the condition, providing a single notification for at least one occurrence of the at least one event or a combined notification for a plurality of occurrences of the at least one event. For example upon meeting the condition the apparatus may be caused to perform, upon meeting the condition, providing a single notification for each occurrence of the at least one event or a combined notification for all occurrences of the at least one event.

The second network function may be a network data analytics function or a consumer network function.

The first network function may comprise a proxy function.

The apparatus may be caused to perform receiving the request from the second network function at the proxy function via a third network function.

Determining at least one occurrence of the at least one event may comrpise receiving an indication of the at least one occurrence from at least one data source at the proxy function.

The first network function may comprise at least one of an access and mobility management function, a session management function, a policy control function, unified data management, application function or operations, administration and management entity.

The apparatus may be caused to perform providing an indication from the first network function to a network resource function that the first network function supports conditional notification.

In an eighth aspect there is provided a computer readable medium comprising program instructions for causing an apparatus to perform at least the following providing, to a first network function from a second network function, a request for notification of at least one event, wherein the request comprises at least one condition to trigger notification of the at least one event and receiving a notification of the at least one event from the first network function at the second network function accoriding to the at least one condition.

The at least one condition may comprise one or more of a time window, a number of occurrences of the at least one event, an occurrence of an event other than the at least one event, a request from the second network function for notification of the at least one event and expiry of a time period.

The time period may increase after expiry of each time period.

The second network function may be a network data analytics function or a consumer network function.

The first network function may comprise a proxy function.

The apparatus may be caused to perform providing the subscription request from the second network function to the proxy function via a third network function.

The first network function may comprise at least one of an access and mobility management function, a session management function, a policy control function, unified data management, application function or operations, administration and management entity.

The apparatus may be caused to perform receiving an indication at the second network function from a network resource function that the first network function supports conditional notification.

In a ninth aspect there is provided a non-transitory computer readable medium comprising program instructions for causing an apparatus to perform at least the method according to the third aspect or a method according to the fourth aspect.

In the aspects described above and in the following description, providing a notification of at least one occurrence of the at least one event to the second network function according to the at least one condition may be include providing the notification of at least one occurrence of the at least one event to the second network function if the at least one condition is met In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
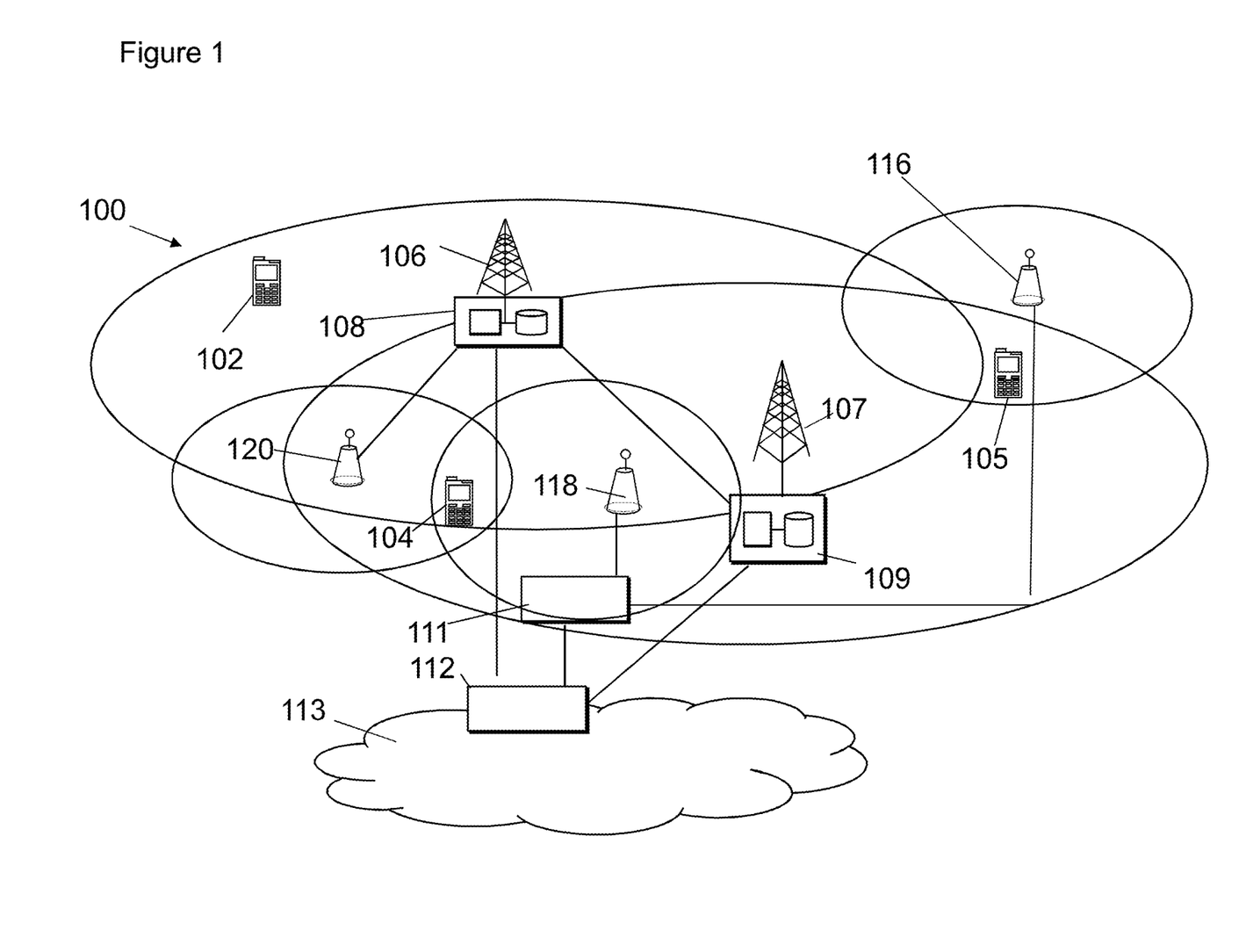
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV), which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G network towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
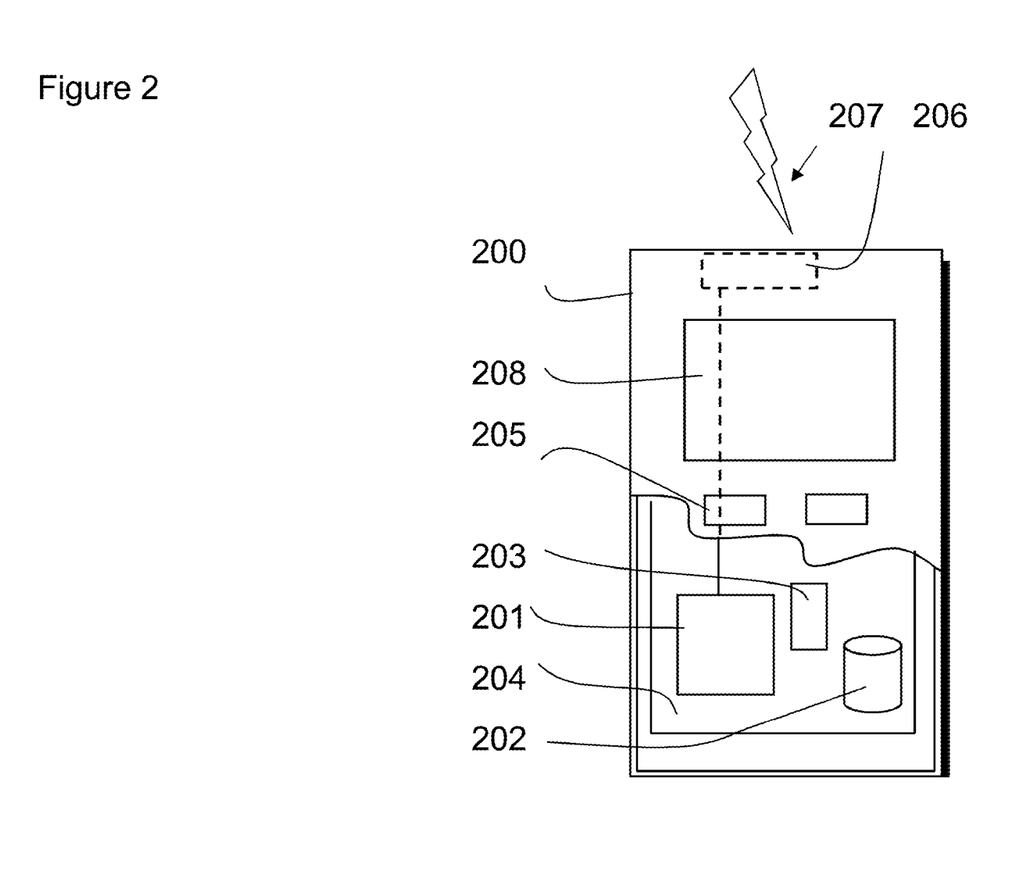
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement.

The antenna arrangement may be arranged internally or externally to the mobile device.

Figure 3:
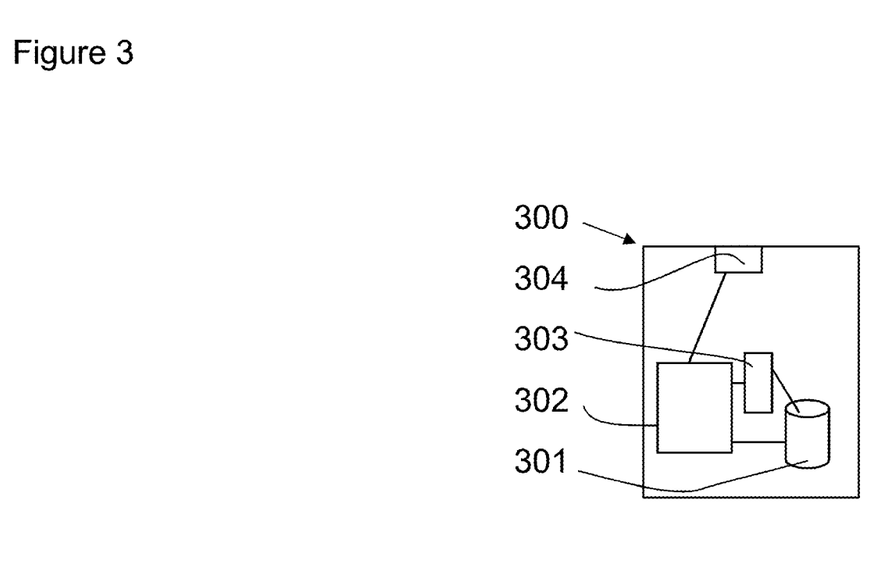
FIG. 3 shows a schematic diagram of an example control apparatus.

FIG. 3 shows an example embodiment of a control apparatus for a communication system indicated in the following also as apparatus, for example to be coupled to and/or for controlling a station of an access system, such as a RAN node, e.g. a base station, eNB or gNB, a relay node or a core network node such as an MME or S-GW or P-GW, or a core network function (NF) such as AMF/SMF, or a server or host. The method may be implanted in a single control apparatus, in short apparatus, or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller ora spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. Similary the control apparatus may be or comprise a network function, e.g. a first or a second network function, or an entity or node in the CN. Alternatively, the the control apparatus may be provided in a network function, e.g. a first or a second network function, or an entity or node in the CN.

The Network Data Analytics Function (NWDAF) was first defined in 3GPP Release 15 and extended in Release 16 after completion of an SA2 study item documented in 3GPP TR 23.791. For 3GPP Release 17, there is currently an on-going study to further enhance the NWDAF, documented in 3GPP TR 23.700-91. The NWDAF calculates analytics based on data collected from different data sources, such as the AMF, SMF, PCF, UDM, AF, and OAM. It offers analytics identified by a 3GPP defined analytics identifier to Consumers using the services based architecture defined for the 5GC.

An NWDAF collects data from different NFs via a Subscribe/Notify API framework where data may be collected at the NWDAF fora long duration. Generally, notifications to the NWDAF are provided when an event of interest occurs at a data source. Currently, there is no way for the NWDAF to control how data sources/producers (NFs) or a Data Management Framework provides data according to the NWDAF requirements.

Data Collection load management is described in 3GPP release 17 TS23.700-91 Key Issue 11 "Increasing efficiency of data collection".

Data collection load management may also be applicable for any NF to NF communication where a subscription generating NF wants to control notifications.

A Data Management Framework has been proposed as a solution for several Key Issues, where the Data Management Framework comprises a Messaging Framework, a Data Collection Coordination Function (DCCF) and a Data Repository.

The Messaging Framework is for Data Forwarding and Replication and has optional Adaptors (Consumer Adaptor (3CA), Producer Adaptor (3PA) and DCCF Adaptor (DA)) to isolate the Messaging Framework protocol from the Data Source and the Data Consumer.

The DCCF is a control-plane function that coordinates data collection and triggers data delivery to Data Consumers. A DCCF may support multiple Data Sources, Data Consumers, and Message Frameworks. However, to prevent duplicate data collection, each Data Source is associated with only one DCCF.

Figure 4:
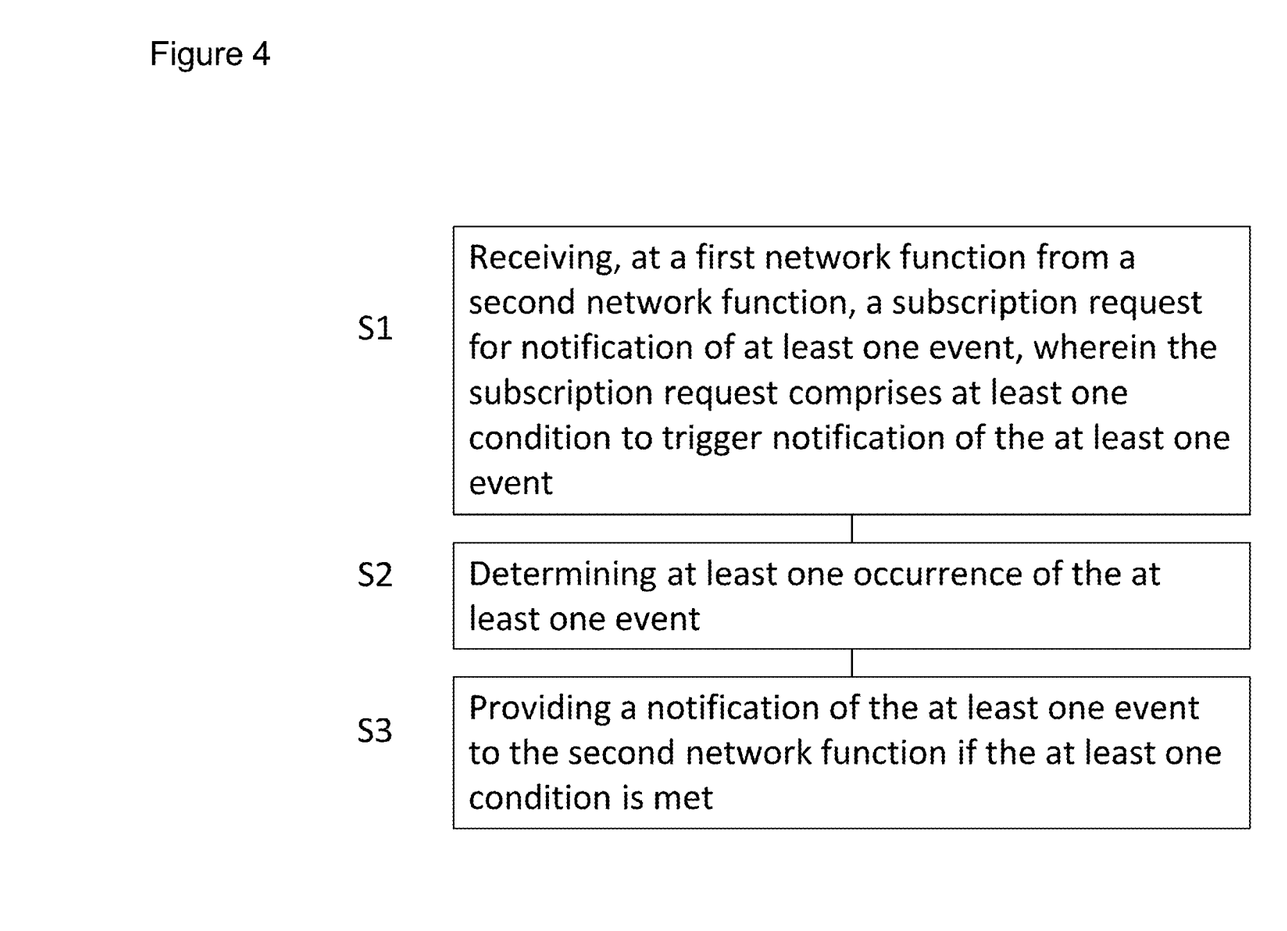
FIG. 4 shows a flowchart of a method according to an example embodiment.

FIG. 4 shows a flowchart of a method according to an example embodiment.

In a first step, S1, the method comprises receiving, at a first network function from a second network function, a subscription request for notification of at least one event, wherein the subscription request comprises at least one condition to trigger notification of the at least one event.

In a second optional step, S2, the method comprises determining at least one occurrence of the at least one event. In some embodiments, an indication of the occurrence of the at least one event may be obtained, e.g. received, at the first network function. The indication may be received, for instance, from at least one data source or in general from a network function in the CN.

In a third step, S3, the method comprises providing a notification of the at least one event to the second network function based on the at least one condition, e.g. if the at least one condition is met.

Figure 5:
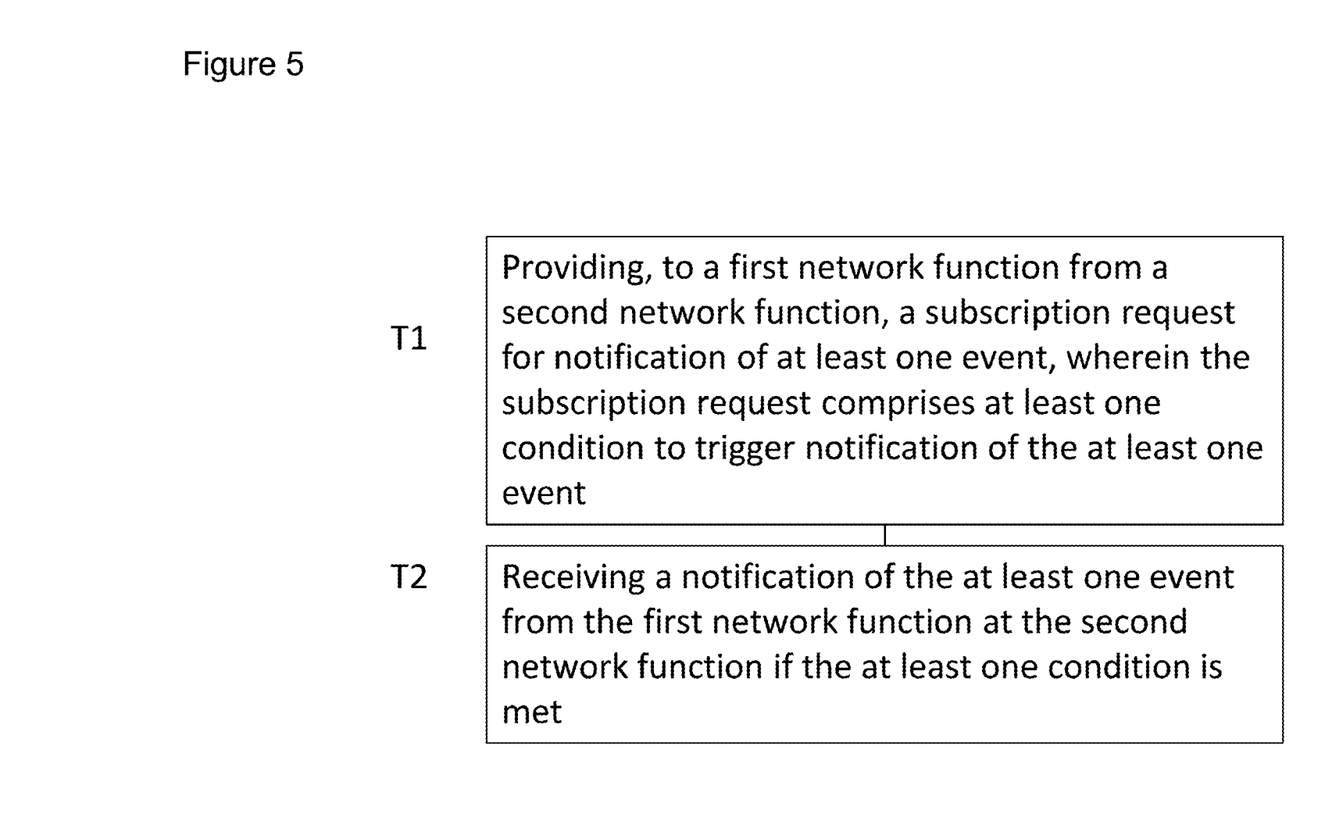
FIG. 5 shows a flowchart of a method according to an example embodiment.

FIG. 5 shows a flowchart of a method according to an example embodiment.

In a first step, T1, the method comprises providing, to a first network function from a second network function, a subscription request for notification of at least one event, wherein the subscription request comprises at least one condition to trigger notification of the at least one event.

In a second step, T2, the method comprises receiving a notification of the at least one event from the first network function at the second network function based on the at least one condition, e.g. if the at least one condition is met.

The first network function may comprise a data source NF, e.g., AMF, SMF, PCF, UDM, AF or OAM.

Alternatively, or in addition, the first network function may comprise a proxy function, such as a Messaging Framework of a Data Management Framework. A proxy function such as a Messaging Framework receives event notifications from a data source (such as a AMF, SMF, PCF, UDM, AF or OAM) and forwards them to a data consumer. The method may comprise receiving the subscription request at the proxy function from the second network function via a third network function, e.g., a DCCF.

Determining at least one occurrence of the at least one event may comprise receiving an indication of the at least one occurrence from at least one data source at the proxy function.

The DCCF service may provide additional functionality, for example to allow one request that requires multiple Data Sources (e.g., AMF and SMF).

The DCCF may determine if data is already being collected by maintaining a record of the prior requests the DCCF has made for data (e.g., via an Nnf_EventExposure service offered by the Data Source). If parameters in a prior request for data match those that needed in a subsequent request, the DCCF may determine that the requested data is already being collected and request the Messaging Framework distribute the data to the new Consumer.

The second network function may be an NWDAF or a consumer NF.

Where the first network function is a data source NF, the method may comprise providing an indication from the first network function to a NRF that the first network function supports conditional notification (i.e. that notification of an event is provided if at least one condition is met, which may be referred to as enhanced subscription). The indication may be provided during a registration procedure between the data source NF and the NRF.

The method may comprise obtaining or receiving an indication at the second network function from the NRF that the firstnetwork function supports conditional notification.

The indication may be provided during a discovery procedure between the second network function and the NRF.

The indication that a network function supports conditional notification may comprise a flag, e.g., a flag that EnhancedSubscritionSupported=True.

The method may enable a subscribing NF to provide a policy for management of Notifications and the enforcement of that policy in a Producer NF or a Data Management Framework. The policy may define how and when the NF or Data Management Framework should generate the Notifications.

The at least one condition may comprise a number of occurrences of the at least one event.

The indication of the number of occurrences of the event may be referred to as EventClubRate. In one example embodiment, if EventClubRate=4, a NF service producer generates a notification and stores it locally. When the notification count reaches four, then all four clubbed reports may be sent as a single notification.

For example, when collecting data from AF for a number of video calls (Communication analytics), if four video calls are made, then only a single notification is generated having all four video call details.

Alternatively, or in addition an AMF reports 'loss of connectivity' events via a notification, a notification is provided only when connectivity is lost four times for a specific UE in a specific time window.

The indication of the number of the number of occurrences of the at least one event may comprise an indication that every nth notification is to be skipped along with a subsequent notification. For example, every third notification may be buffered and sent along with other notifications.

The at least one condition may comprise a time window.

In one example embodiment, the time window comprises a Notification Time Window, where the notification must be generated at a specific time window (e.g., 2-3 AM daily). The time window may be specified such that an AMF reports communication failure Notification for all UEs (i.e., a set of UEs) in off-peak hours.

This parameter may be leveraged with the eventClubRate, so that the specific time window is used to club multiple notifications together.

The at least one condition may comprise an occurrence of an event other than the at least one event. This may be referred to as cross event reference-based notification. In one example embodiment, when a subscribing NF is subscribing to multiple events (say event X and event Y) at the same producer, the notification for an event X may be buffered and reported only when event Y occurs.

The at least one condition may comprise a request from the second network function for notification of the at least one event. That is, the condition may comprise a consumer triggered notification and the notification is buffered and reported only when the subscribing NF asks for notification.

In one example embodiment, a NWDAF has subscribed to AF for video calls (communication analytics). AF starts buffering the notification. When Consumer or NWDAF wants a notification, NWDAF sends a SubscriptionModify (PATCH) to update the subscription with a flag "SendNotificationNow=True". This parameter indicates that the notification is to be sent now (clubbing all the reports generated till the time SubscriptionModify is received).

This flag may be included in the Unsubscribe request. I.e., once NWDAF sends an Unsubscribe Request with the flag, then buffered notifications are sent to the NWDAF. Then the Data Source would stop generating notifications.

The at least one condition may comprise expiry of a time period. For example, data may be reported at an exact time (e.g., every 30 min), irrespective of whether an event occurs or not. If the event does not occur at the time of notification, then a Notification 'indicating event does not occur' or a notification 'indicating the previous status report' is generated.

The time period may increase after expiry of each time period. This may be referred to as an exponential time window. For example, the first notification is sent after 5 min, the next notification is sent after 10 min, and the third is after 15 min etc.

Figure 6:
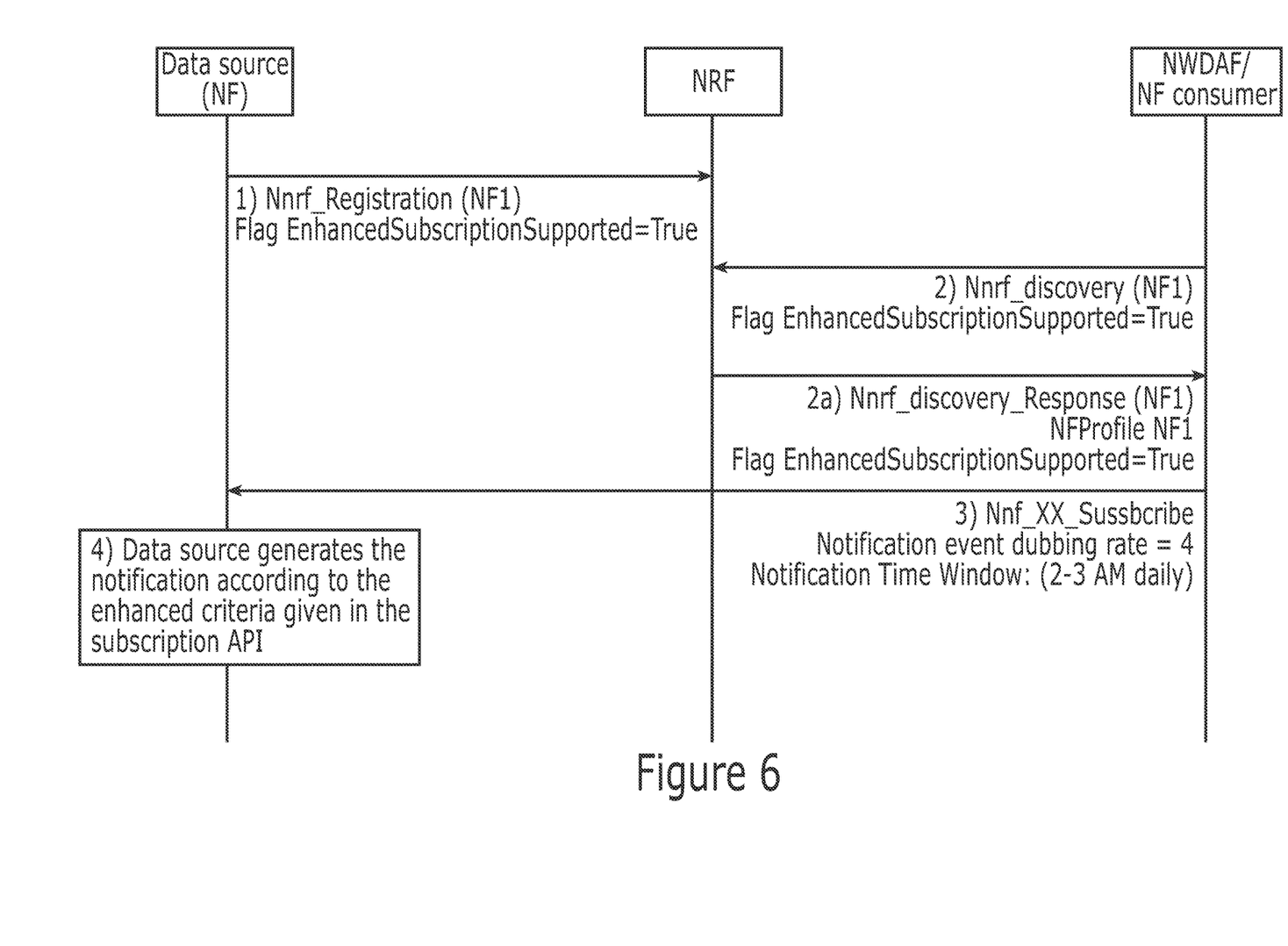
FIG. 6 shows a signalling flow between a data source (NF), NRF and NWDAF or NF consumer according to an example embodiment.

FIG. 6 shows a signalling diagram between a NF service producer, NRF, and a NWDAF or NF consumer according to an example embodiment.

In step 1, the NF service producer supporting the enhanced framework of Subscription/Notification, adds a enhancedSubscriptionFlag=True in NFProfile while registering in the NRF.

The producer may have persistent storage (UDSF/Message platform/UDR) or in memory storage where data can be stored temporarily for a longer duration.

In step 2, the consumer NF or NWDAF performs a discovery procedure for the data source/NF producer from the NRF in step 2a, receives a enhancedSubscriptionFlag=True from the NRF in the NFProfile of the data source NF. After the NWDAF or consumer NF discovers a Data Source that supports enhancedSubscription, the NWDAF or consumer NF plans the analytics scheduling task, e.g., prioritizes certain analytics at a certain time interval.

In step 3, the NF consumer/NWDAF adds parameters in the subscription API to control the notification.

In this example embodiment, the first parameter is EventClubRate=4 and the second parameter is the Notification Time Window: (2-3 AM daily).

In step 4, the NF producer receives the subscription request with this set of parameters and provides the notifications accordingly. Based on the request, the NF service producer starts storing notification reports locally and sends notification based on the received criteria.

The method described with reference to FIGS. 4 and 5 may be implemented by a Data Management Framework as described previously.

Figure 7:
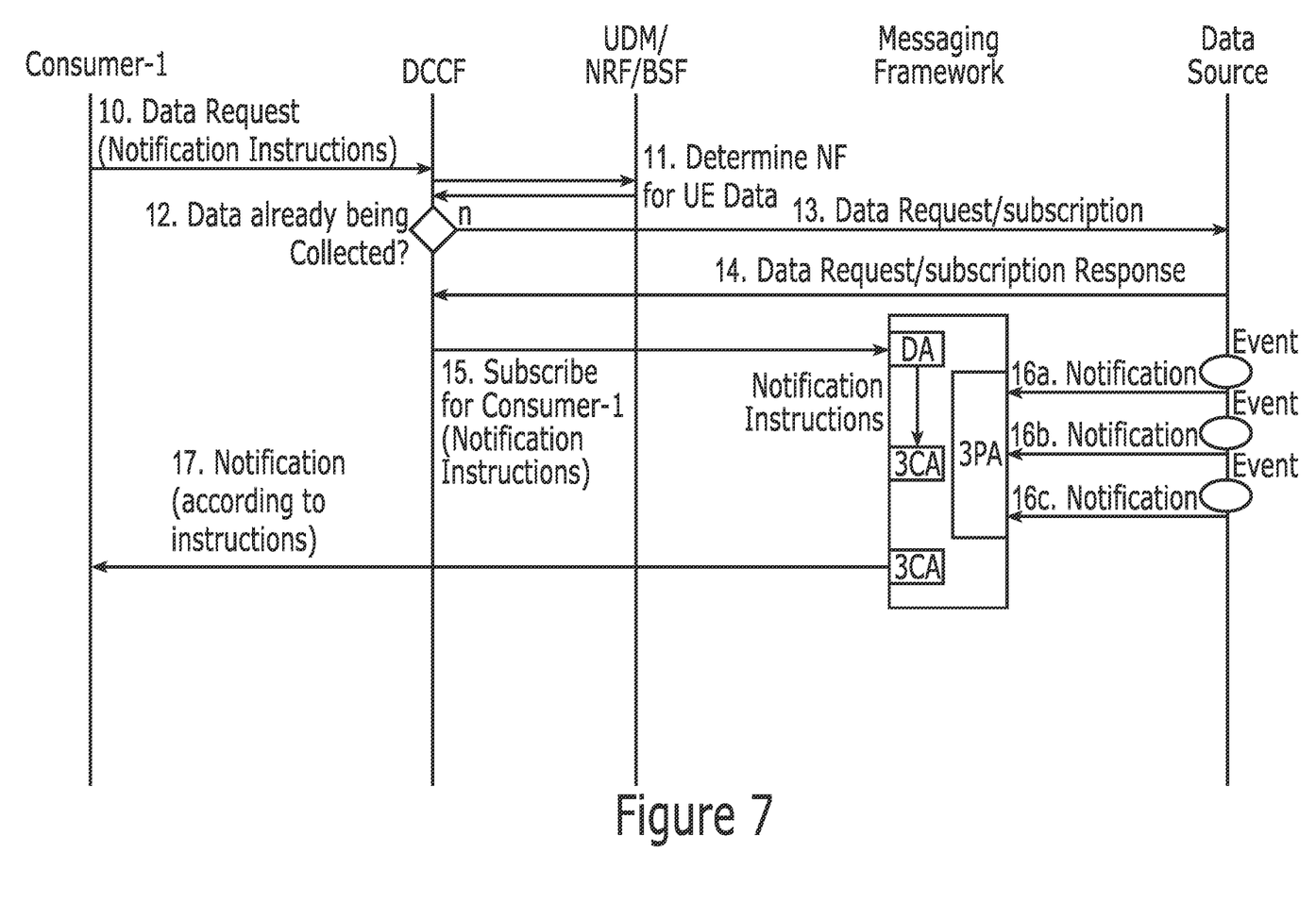
FIG. 7 shows a signalling flow between a data source, data management framework and consumer according to an example embodiment.

FIG. 7 shows an example signalling flow in the context of the Data Management Framework that has been proposed for eNA. In this embodiment the Data Source need not be aware of the Notification Instructions requested by the Consumer.

In step 10 the consumer (e.g., NWDAF) sends a request for data to the DCCF. The request contains Notification Instructions. This is equivalent to step 3 of the embodiment shown in FIG. 6. The request may allow the consumer to use one or more DCCF services providing additional functionality. For example one request that requires multiple Data Sources (eg: AMF and SMF) may be allowed. In addition or alternatively the DCCF service may allow formatting of notifications according to one or more conditions. Said one or more conditions may be specified by the consumer. Examples of the one or more conditions will be given below.

In steps 11 to 14, the DCCF determines a Data Source that can provide the requested data and if the data is not already being collected by the Messaging Framework, sends a subscription request and receives a Response from the Data Source.

In step 15, the DCCF sends a Subscription Request for Consumer-1 to the Messaging Framework. The Request may contain the Notification Instructions (e.g., Notification Clubbing Rate, Notification Time Window, etc.). The DCCF Adaptor (DA) in the Messaging Framework may send the Notification Instructions to the Consumer Adaptor (3CA) in the Messaging Framework. In particular, the notification instructions may include at least one condition or formatting (condition) requested by a consumer.

The formatting (condition) may include:
 notification Event clubbing (e.g. buffering and sending of several notifications in one message).
 a notification Time Window. In this case notifications may be buffered and sent between two predefined times, e.g. between 2 and 3 AM.
 Cross event reference-based notification. According to this condition, when a subscribing NF is subscribing to multiple events (e.g.: event X and event Y) the notification for an Event-X may be buffered and reported when the Event-Y occurs.

Consumer triggered Notification:

Exact time-based Notification without the event. According to this condition, data is reported at an exact time, irrespective of event occurs or not. For example data may be transmitted or polled every fixed time interval, e.g. every 30 min.

Mathematical calculation based notification. Accodrding to this condition, the notification may be scheduled according to a non-linear time window, e.g. Exponential time window). Accordingly, the first notification may be sent after 5 min, the next notification may be sent after 10 min, the third after 15 min etc. Clearly, the above is an example and other algorithms for defining the time window for the notification and in general the handling of the notification may be also chosen.

The above list of conditions is presented with reference to FIG. 7 for explanatory purposes, but it should be clear that the conditions mentioned with reference to FIG. 7 are also applicable to all the embodiments described in this disclosure.

In step 16, the Data Source generates Notifications when events occur and sends them to the Producer Adaptor (3PA) in the Messaging Framework In step 17, when conditions in the Notification Instructions are satisfied, the 3CA sends one or more Notifications to the Consumer (e.g., NWDAF).

Notifications may be buffered in the NF service producer that is generating the notification or in the Data Management Framework for a defined time duration, notifications may be grouped together (e.g., a notification may be held in the NF service producer or the Data Management Framework and when 5 events occur, then one notification or all 5 notifications are sent in one message), a notification may be sent at a specific time with all clubbed events, rather than each event is being reported (e.g., notifications may be sent when network loading is expected to be low, or in a manner that distributes notification reception at the NWDAF over time).

If source NF(s) or a Data Management Framework reports data according to NWDAF instructions as mentioned above, the NWDAF load may be managed and the NWDAF may have more granular control over the data reporting.

The method may be implemented in a control apparatus as described with reference to FIG. 3.

An apparatus may comprise means for receiving, at a first network function from a second network function, a subscription request for notification of at least one event, wherein the subscription request comprises at least one condition to trigger notification of the at least one event, and providing a notification of at least one occurrence of the at least one event to the second network function accoriding to the at least one condition.

Alternatively, or in addition, an apparatus may comprise means for providing, to a first network function from a second network function, a subscription request for notification of at least one event, wherein the subscription request comprises at least one condition to trigger notification of the at least one event and receiving a notification of the at least one event from the first network function at the second network function accoriding to the at least one condition.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and the 5GS, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising: at least one processor and at least one memory including a computer program code, the at least one memory and computer program code configured to, with the at least one processor, cause the apparatus at least to:
receive, at a first network function from a second network function, a request for notification of at least one event, wherein the request comprises at least one condition to trigger notification of the at least one event, wherein the at least one condition comprises an expiry of a time period, the time period increasing after expiry of each time period; and
provide a notification of at least one occurrence of the at least one event to the second network function according to the at least one condition.

2. An apparatus according to claim 1, wherein the at least one memory and computer program code are configured to, with the at least one processor, cause the apparatus to, upon meeting the condition, provide a single notification for at least one occurrence of the at least one event or a combined notification for a plurality of occurrences of the at least one event.

3. An apparatus according to claim 1, wherein the second network function is a network data analytics function or a consumer network function.

4. An apparatus according to claim 1, wherein the first network function comprises a proxy function.

5. An apparatus according to claim 4, wherein the at least one memory and computer program code are configured to, with the at least one processor, cause the apparatus to receive the request from the second network function at the proxy function via a third network function.

6. An apparatus according to claim 4, wherein the at least one memory and computer program code are configured to, with the at least one processor, cause the apparatus to receive an indication of the at least one occurrence from at least one data source at the proxy function.

7. An apparatus according to claim 1, wherein the first network function comprises at least one of an access and mobility management function, a session management function, a policy control function, unified data management, an application function or an operations, administration and management entity.

8. An apparatus according to claim 7, wherein the at least one memory and computer program code are configured to, with the at least one processor, cause the apparatus to provide an indication from the first network function to a network resource function that the first network function supports conditional notification.

9. An apparatus according to claim 1, wherein the at least one condition further comprises one or more of a time window, a number of occurrences of the at least one event, an occurrence of an event other than the at least one event, or a request from the second network function for notification of the at least one event.

10. An apparatus comprising: at least one processor and at least one memory including a computer program code, the at least one memory and computer program code configured to, with the at least one processor, cause the apparatus at least to:
provide, to a first network function from a second network function, a request for notification of at least one event, wherein the request comprises at least one condition to trigger notification of the at least one event, wherein the at least one condition comprises an expiry of a time period, the time period increasing after expiry of each time period; and
receive a notification of the at least one event from the first network function at the second network function according to the at least one condition.

11. An apparatus according to claim 10, wherein the second network function is a network data analytics function or a consumer network function.

12. An apparatus according to claim 10, wherein the first network function comprises a proxy function.

13. An apparatus according to claim 12, wherein the at least one memory and computer program code are configured to, with the at least one processor, cause the apparatus to provide the request from the second network function to the proxy function via a third network function.

14. An apparatus according to claim 10, wherein the first network function comprises at least one of an access and mobility management function, a session management function, a policy control function, unified data management, an application function or an operations, administration and management entity.

15. An apparatus according to claim 14, wherein the at least one memory and computer program code are configured to, with the at least one processor, cause the apparatus to receive an indication at the second network function from a network resource function that the first network function supports conditional notification.

16. An apparatus according to claim 10, wherein the at least one condition further comprises one or more of a time window, a number of occurrences of the at least one event, an occurrence of an event other than the at least one event, or a request from the second network function for notification of the at least one event.

17. A method comprising:
receiving, at a first network function from a second network function, a request for notification of at least one event, wherein the request comprises at least one condition to trigger notification of the at least one event, wherein the at least one condition comprises an expiry of a time period, the time period increasing after expiry of each time period; and
providing a notification of at least one occurrence of the at least one event to the second network function according to the at least one condition.

18. A method according to claim 17, wherein providing the notification comprises providing, upon meeting the condition, a single notification for at least one occurrence of the at least one event or a combined notification for a plurality of occurrences of the at least one event.

19. An apparatus according to claim 17, wherein the at least one condition further comprises one or more of a time window, a number of occurrences of the at least one event, an occurrence of an event other than the at least one event, or a request from the second network function for notification of the at least one event.

20. A method comprising:
providing, to a first network function from a second network function, a request for notification of at least one event, wherein the request comprises at least one condition to trigger notification of the at least one event, wherein the at least one condition comprises an expiry of a time period, the time period increasing after expiry of each time period; and
receiving a notification of the at least one event from the first network function at the second network function according to the at least one condition.

21. A method according to claim 20, wherein the first network function comprises at least one of an access and mobility management function, a session management function, a policy control function, unified data management, an application function or an operations, administration and management entity, and wherein receiving the notification comprises receiving an indication at the second network function from a network resource function that the first network function supports conditional notification.

22. An apparatus according to claim 20, wherein the at least one condition further comprises one or more of a time window, a number of occurrences of the at least one event, an occurrence of an event other than the at least one event, or a request from the second network function for notification of the at least one event.

* * * * *

UNITED STATES PATENT AND TRADEMARK OFFICE
CERTIFICATE OF CORRECTION

PATENT NO. : 11,777,781 B2
APPLICATION NO. : 17/394549
DATED : October 3, 2023
INVENTOR(S) : Saurabh Khare et al.

It is certified that error appears in the above-identified patent and that said Letters Patent is hereby corrected as shown below:

On the Title Page

In Column 1, item (30), Foreign Application Priority Data, Line 1, delete "(WO)" and insert -- (EP) --, therefor.

In Column 2, item (57), ABSTRACT, Line 7, delete "accoriding" and insert -- according --, therefor.

In the Drawings

In sheet 6 of 7, FIG. 6, under 3), Line 1, delete "Sussbcribe" and insert -- Subscribe --, therefor.

In the Claims

In Column 18, Line 64, Claim 19, delete "An apparatus according to claim" and insert -- A method according to claim --, therefor.

In Column 19, Line 23, Claim 22, delete "An apparatus according to claim" and insert -- A method according to claim --, therefor.

Signed and Sealed this
Twenty-seventh Day of August, 2024

Katherine Kelly Vidal
*Director of the United States Patent and Trademark Office*